(12) United States Patent  
Maeno

(10) Patent No.: US 8,830,117 B2
(45) Date of Patent: Sep. 9, 2014

(54) METHOD, DEVICE AND PROGRAM FOR SETTING THRESHOLD, AND METHOD, DEVICE AND PROGRAM FOR DETECTING TARGET OBJECT

(75) Inventor: Hitoshi Maeno, Nishinomiya (JP)

(73) Assignee: FURUNO Electric Company Limited, Hyogo-Pref. (JP)

( * ) Notice: Subject to any disclaimer, the term of this patent is extended or adjusted under 35 U.S.C. 154(b) by 594 days.

(21) Appl. No.: 13/176,355

(22) Filed: Jul. 5, 2011

(65) Prior Publication Data

US 2012/0007767 A1 Jan. 12, 2012

(30) Foreign Application Priority Data

Jul. 6, 2010 (JP) ................... 2010-153797

(51) Int. Cl.
*G01S 13/00* (2006.01)
*G01S 13/534* (2006.01)
*G01S 7/292* (2006.01)
*G01S 13/93* (2006.01)

(52) U.S. Cl.
CPC ............. *G01S 7/2927* (2013.01); *G01S 13/534* (2013.01); *G01S 13/9307* (2013.01)
USPC ................... 342/92; 342/89; 342/91; 342/159

(58) Field of Classification Search
USPC ....................... 342/73, 89–93, 159
See application file for complete search history.

(56) References Cited

U.S. PATENT DOCUMENTS

| | | | | |
|---|---|---|---|---|
| 4,213,127 A | * | 7/1980 | Cole | 342/93 |
| 4,386,353 A | * | 5/1983 | Bleijerveld et al. | 342/91 |
| 4,845,500 A | * | 7/1989 | Cornett et al. | 342/90 |
| 5,337,055 A | * | 8/1994 | Ghignoni | 342/93 |
| 5,357,256 A | * | 10/1994 | Peperone | 342/160 |
| 5,488,377 A | * | 1/1996 | Reynolds et al. | 342/93 |
| 5,539,412 A | * | 7/1996 | Mendelson | 342/192 |
| 5,644,315 A | * | 7/1997 | Long | 342/93 |
| 6,515,615 B2 | * | 2/2003 | Burchett et al. | 342/91 |
| 7,336,219 B1 | * | 2/2008 | Lohmeier et al. | 342/159 |
| 7,737,881 B2 | * | 6/2010 | Stove | 342/93 |
| 7,990,309 B2 | * | 8/2011 | Watts | 342/93 |
| 8,013,781 B2 | * | 9/2011 | Stockmann | 342/93 |
| 2008/0018523 A1 | * | 1/2008 | Kelly et al. | 342/70 |
| 2009/0027255 A1 | * | 1/2009 | Stove | 342/93 |
| 2009/0058713 A1 | * | 3/2009 | Okunishi et al. | 342/91 |
| 2009/0121922 A1 | * | 5/2009 | Fujikawa et al. | 342/185 |

(Continued)

FOREIGN PATENT DOCUMENTS

| | | |
|---|---|---|
| CN | 101377545 A | 3/2009 |
| EP | 0030750 A1 | 6/1981 |

(Continued)

*Primary Examiner* — Peter Bythrow

(74) *Attorney, Agent, or Firm* — Birch, Stewart, Kolasch & Birch, LLP

(57) ABSTRACT

This disclosure provides a method of setting a threshold according to a level of an echo signal containing an unused component. The echo signal is generated by transmitting and receiving a radio wave with an antenna while the antenna revolves. The method includes acquiring levels of the echo signals at every predetermined distance interval and updating a threshold set for an observing position based on the level of the echo signal at the observing position, the threshold set for the observing position, and a threshold set for a position closer to the antenna than the observing position by the predetermined distance on the same sweep.

17 Claims, 12 Drawing Sheets

(56) References Cited

U.S. PATENT DOCUMENTS

| | | | |
|---|---|---|---|
| 2009/0315757 A1* | 12/2009 | Watts | 342/93 |
| 2010/0073218 A1* | 3/2010 | Stockmann | 342/146 |
| 2010/0321231 A1* | 12/2010 | Nakahama | 342/118 |

FOREIGN PATENT DOCUMENTS

| | | |
|---|---|---|
| JP | 2003-227871 A | 8/2003 |
| JP | 2005-77213 A | 3/2005 |
| JP | 2008-256626 A | 10/2008 |

* cited by examiner

METHOD, DEVICE AND PROGRAM FOR SETTING THRESHOLD, AND METHOD, DEVICE AND PROGRAM FOR DETECTING TARGET OBJECT

CROSS-REFERENCE TO RELATED APPLICATION(S)

The application claims priority under 35 U.S.C. §119 to Japanese Patent Application No. 2010-153797, which was filed on Jul. 6, 2010 the entire disclosure of which is hereby incorporated by reference.

TECHNICAL FIELD

The present invention relates to a method of automatically setting a threshold for detecting a target object on the sea and a land by using a radio wave, and further relates to a method of detecting the target object by using the method of automatically setting the threshold.

BACKGROUND OF THE INVENTION

Conventionally, various target object detection devices for transmitting radio waves to detect a target object based on the echo signals of the transmitted radio waves have been devised. In such target object detection devices, for example a target object detection device equipped in a ship, a threshold for a target object detection may be set for discriminating a target object, such as another ship or a land, from a sea clutter or a noise.

As a conventional method of setting a threshold, there is a method of calculating a moving average by using a group of echo signals aligned along a distance direction, that is a direction away from an antenna where the antenna is set as a reference position (so called CFAR) exists. Further, JP2008-256626A discloses a method of calculating a histogram of a group of echo signals aligned along a distance direction.

However, in the method of using the moving average, if a target object such as another ship or a land exists within a zone where the moving average is calculated, a threshold is increased corresponding to a level of an echo of the target object and the echo of the target object ends up being suppressed.

Further, in a case where the number of sample echoes of the target object within an area where a histogram is calculated is small and/or a level difference between a clutter and the target object echo is small, a trough to clearly distinguish the target object from the clutter does not appear within the histogram, and therefore, it is difficult to determine the threshold.

SUMMARY OF THE INVENTION

Therefore, the present invention is made in view of the situations as described above, and provides a method of automatically and further accurately setting a threshold for discriminating a target object from a sea clutter as well as a noise, without being affected by whether the target object exists.

According to an aspect of the invention, a method of setting a threshold according to a level of an echo signal containing an unused component is provided The echo signal is generated by transmitting and receiving a radio wave with an antenna while the antenna revolves. The method of setting the threshold includes acquiring levels of the echo signals at every predetermined distance interval and updating a threshold set for an observing position based on the level of the echo signal at the observing position, the threshold set for the observing position, and a threshold set for a position closer to the antenna than the observing position by the predetermined distance on the same sweep.

In this method, the threshold set for the observing position is updated based on the threshold and the level of the echo signal at the observing position and the threshold closer to the antenna than the observing position by the predetermined distance, and thereby the threshold is updated according to a situation around the observing position.

The updating the threshold may include updating the threshold set for the observing position based on a comparison of the level of the echo signal at the observing position with the threshold set for the observing position and a comparison of the threshold set for the observing position with the threshold set for the position closer to the antenna than the observing position by the predetermined distance on the same sweep.

Here, the update of the threshold based on the comparisons among the thresholds and the level of the echo signal, respectively, is further specifically described.

The updating the threshold may include updating the threshold to be lower when the level of the echo signal at the observing position is below the threshold set for the observing position, and updating the threshold to be higher when the level of the echo signal at the observing position is above the threshold set for the observing position and the threshold set for the observing position is below the threshold set for the position closer to the antenna than the observing position by the predetermined distance on the same sweep.

The updating the threshold may include updating the threshold to be lower when the level of the echo signal at the observing position is above the threshold set for the observing position and the threshold set for the observing position is above the threshold set for the position closer to the antenna than the observing position by the predetermined distance on the same sweep.

Here, the methods of updating the threshold, that is criteria for determining whether to decrease or increase the threshold, based on any one of the above described comparisons among the thresholds and the level of the echo signal is further specifically described.

The updating the threshold may include setting a lowering amount of the threshold when the level of the echo signal at the observing position is above the threshold set for the observing position and the threshold set for the observing position is above the threshold set for the position closer to the antenna than the observing position by the predetermined distance on the same sweep to be less than a lowering amount of the threshold that is used when the level of the echo signal at the observing position is below the threshold set for the observing position.

Here, a relation between the lowering amounts of the threshold is described because the threshold is decreased in a plurality cases of the comparisons described above.

When comparing the level of the echo signal at the observing position with the threshold set for the observing position, the updating the threshold may use a value obtained by subtracting a predetermined offset value from the threshold set for the observing position, as the comparison result.

By setting an offset value, the level to which the threshold converges can be controlled.

The updating the threshold may include updating the thresholds along a distance direction extending radially in a transmitting direction of the radio wave with respect to the position of the antenna as a reference position, the update along the distance direction being performed at a plurality of particular azimuths set at a predetermined azimuth angle interval along a revolving direction of the antenna, and interpolating, based on the thresholds set for two of the particular azimuths interposing an individual azimuth therebetween, thresholds along the distance direction at the individual azimuth.

Here, not the method of setting the threshold along the distance direction simply at a single azimuth but the method of setting the threshold over the entire peripheral of the revolution of the antenna is described. That is, although the adaptive setting of the threshold for each position along the distance direction at the single azimuth may be performed for the entire azimuth, the setting of the threshold may be performed by the other method. In this method, the threshold setting is performed only at the particular azimuths set at the predetermined azimuth angle interval within the entire peripheral azimuth. Further, at each of the individual azimuths which are different from the particular azimuths, the threshold setting is performed by using the thresholds in the particular azimuths. Thereby, the threshold setting can be simpler than setting the threshold for each of the entire azimuth one by one.

The interpolating the threshold may include weighting with azimuth angle differences between the individual azimuth and the two particular azimuths, respectively, the thresholds set for the two particular azimuths at the same distance position.

Here, the specific contents of the interpolation in the method of setting the threshold over the entire periphery is described. By using this method, the interpolation can be performed by simple calculation processing.

According to another aspect of the invention, a method of detecting a target object is provided, which includes the method of setting the threshold of any one of the aspects described above and determining that the echo signal with a level above the set threshold is an echo signal of the target object.

In this method, the threshold is set adaptively to situations and, therefore, the echo of the target object can further accurately be discriminated.

According to another aspect of the invention, a method of detecting a target object is provided, which includes the method of setting the threshold of any one of the aspects described above and creating detection image data from which the echo signal with a level below the set threshold is suppressed.

In this method, the threshold is set adaptively to situations and, therefore, the echo signal of an unused component can further accurately be suppressed. Thereby, the echo of the unused component is suppressed and the detection image data in which the echo of the target object is clear can be created.

According to the aspects of the invention, the threshold for discriminating the echo of the target object from the echo of the unused component, such as a sea clutter or a noise, can adaptively set according to situations. Thereby, the appropriate threshold can automatically be set without being affected by the existence of the target object.

BRIEF DESCRIPTION OF THE DRAWINGS

The present disclosure is illustrated by way of example and not by way of limitation in the figures of the accompanying drawings, in which the like reference numeral indicate like elements and in which.

DESCRIPTION OF EMBODIMENTS

Figure 1:
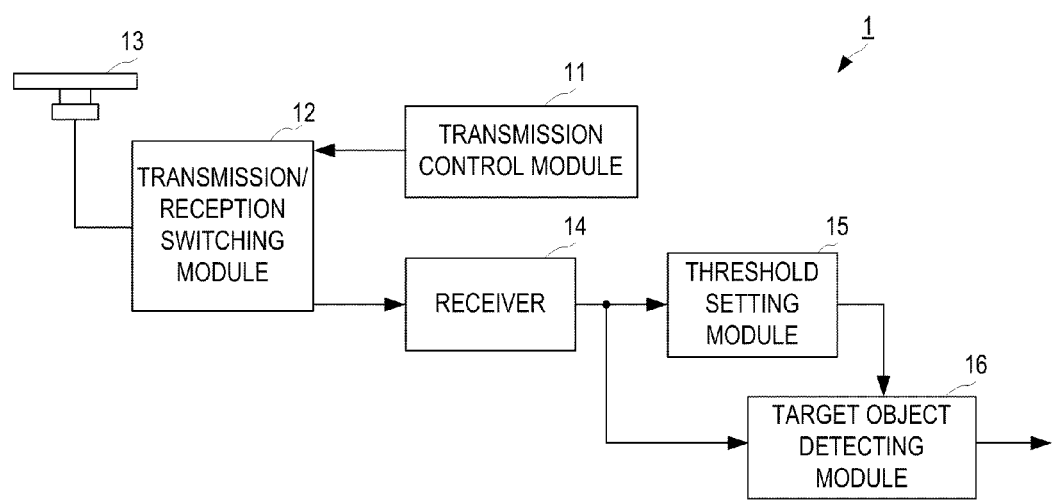
FIG. 1 is a block diagram showing the entire configuration of a target object detection device according to the embodiments of present invention.

Hereinafter, a method of detecting a target object, the method including a method of setting the threshold, and a target object detection device equipped with a threshold setting device according to some embodiments of the present invention are described in detail with reference to the accompanying drawings. FIG. 1 is a block diagram showing the entire configuration of a target object detection device 1 according to the present invention.

First Embodiment

The target object detection device 1 includes a transmission control module 11, a transmission/reception switching module 12, an antenna 13, a receiver 14, a threshold setting module 15 corresponding to a threshold setting device of the invention, and a target object detecting module 16.

The transmission control module 11 generates a pulse shaped transmission signal at every predetermined transmission timing and outputs the transmission signal to the transmission/reception switching module 12. The transmission/reception switching module 12 outputs the transmission signal from the transmission control module 11 to the antenna 13.

The antenna 13 converts the transmission signal into a radio wave and emits outside while revolving at a predetermined revolving speed, and it further receives the radio wave from the outside, converts it into an electric signal to output as a reception signal to the transmission/reception switching module 12. The transmission/reception switching module 12 outputs the reception signal from the antenna 13 to the receiver 14.

The receiver 14 generates echo signals by sampling the reception signal at a predetermined time cycle. Here, the receiver 14 generates the echo signals of which a level transits along a distance direction for a sweep of each azimuth direction based on azimuth direction information. The receiver 14 outputs the echo signals to the threshold setting module 15 and the target object detecting module 16 in increments of a single sweep. Here, the azimuth direction information is an absolute azimuth direction set based on, for example, azimuth angle information (a particular direction, for example a bow azimuth direction, is a reference azimuth direction) from the antenna 13 and a bow azimuth direction of a ship installed with the target object detection device. Note that, the azimuth direction information may also be applied to the threshold setting module 15 and the target object detecting module 16.

The threshold setting module 15 includes a threshold setting program written with, for example, a threshold setting algorithm (described later), a memory for storing the set thresholds and the echo signals, and a processing calculating module for executing the threshold setting algorithm.

The threshold setting module 15 (detailed algorithm is described later) updates a threshold set for an observing position based on a level of an echo signal at the observing position, the threshold already set for the observing position, and a threshold set for a position (hereinafter, it may simply be referred to as the "adjacent position") adjacent on the antenna side to the observing position with a sampling distance length therebetween on the single sweep. That is, the threshold setting module 15 adaptively updates the threshold to be optimum according to a situation at the observing position, specifically, a level of unused components, such as a sea clutter and a noise, and the existence of a target object. The threshold setting module 15 outputs the set threshold to the target detecting module 16.

The target object detecting module 16 includes a memory for storing a target object detecting program written with, for example, a target object detecting algorithm, the thresholds and the echo signals transmitted from the threshold setting module 15, and a processing calculating module for executing the target object detecting algorithm. Note that, the target object detecting module 16 may use the same resource as the threshold setting module 15 or may use an individual resource.

The target object detecting module 16 performs target object detection processing based on the echo signals from the receiver 14 and the thresholds corresponding to the echo signals set by the threshold setting module 15. The target object detection processing is, for example, target object determination processing and detection image data formation processing. The target object determination processing determines that when a level of an echo signal (hereinafter, it may simply be referred to as "echo level") is above a threshold, the echo signal is an echo signal from a target object, and outputs the determination result. The detection image data formation processing uppresses an echo level that is below a threshold so as to form image data in which only the echo signal with the level the same as the threshold or higher appears further distinctively. By performing the above adaptive update of the threshold, the target object can further accurately be detected from the reception signal containing unused components such as a sea clutter and a noise. Moreover, by performing the adaptive update of the threshold, the unused components such as the sea clutter and the noise is suppressed and a detection image where an image of the target object further accurately and clearly appears can be generated.

Figure 2:
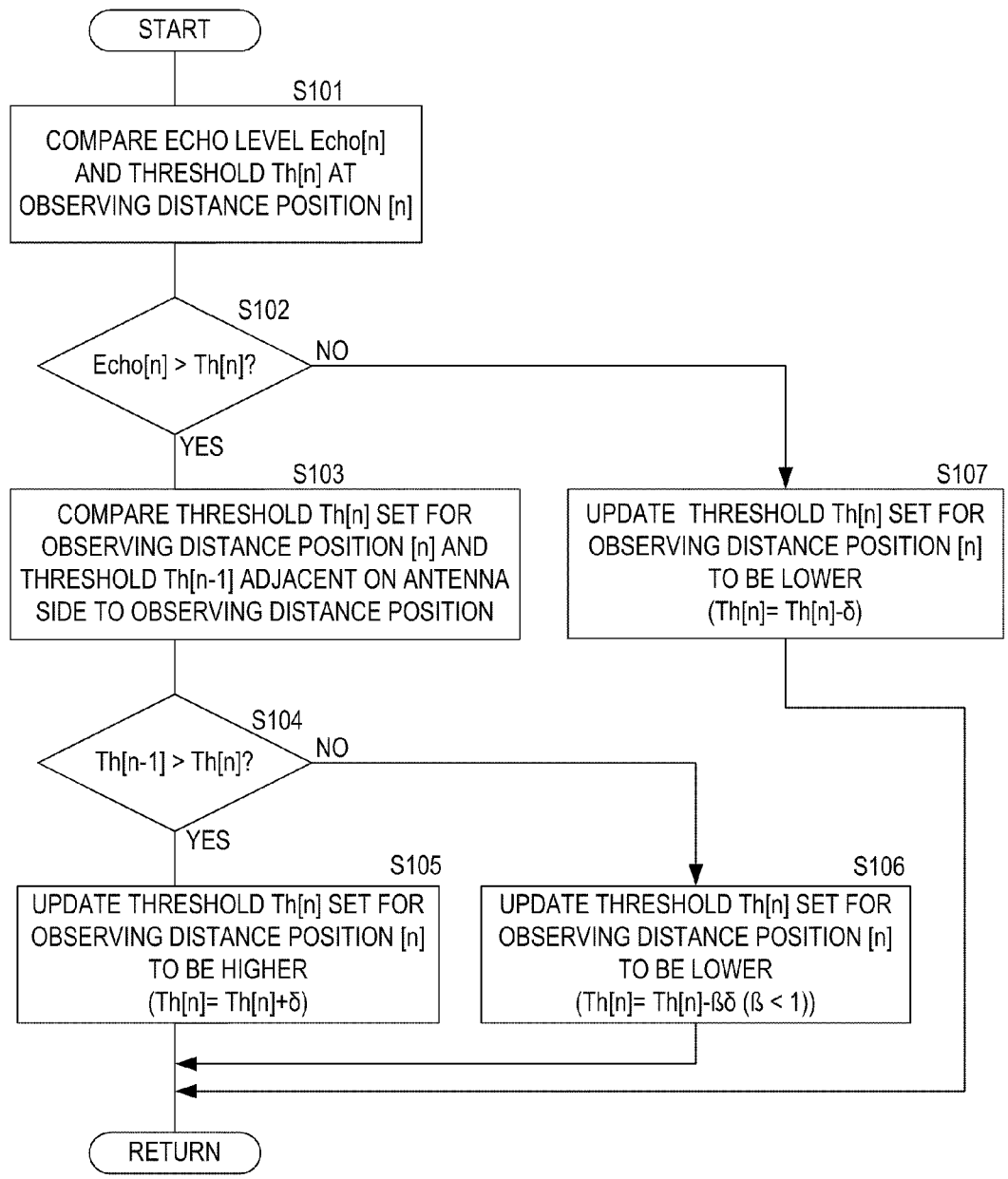
FIG. 2 is a flowchart of a threshold setting.
Figure 3A:
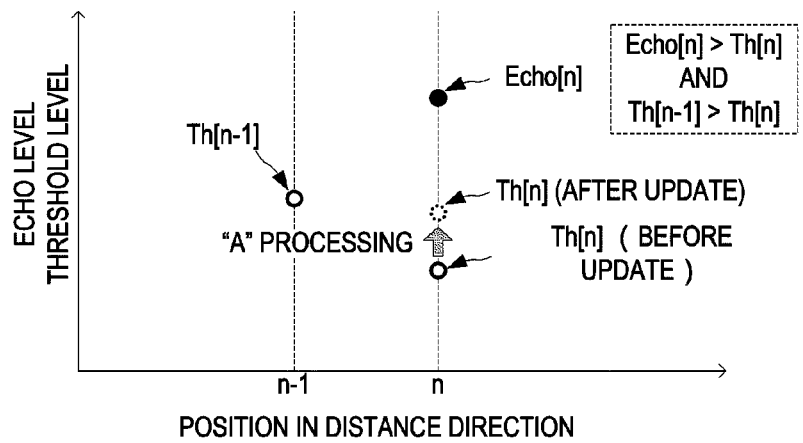
FIGS. 3A to 3C are charts explaining contents of various kinds of threshold setting processing performed by the threshold setting flow.
Figure 3B:
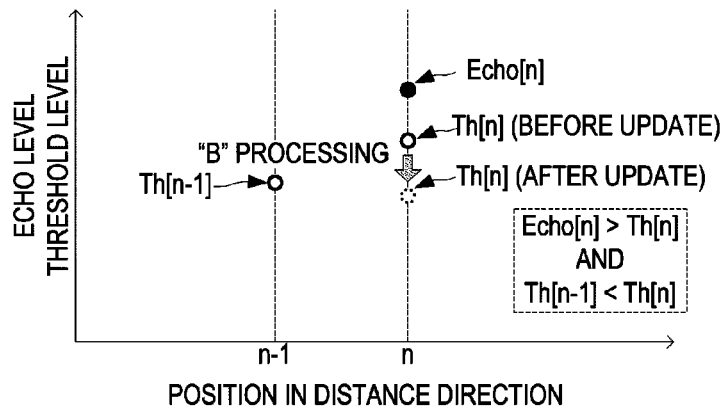
Figure 3C:
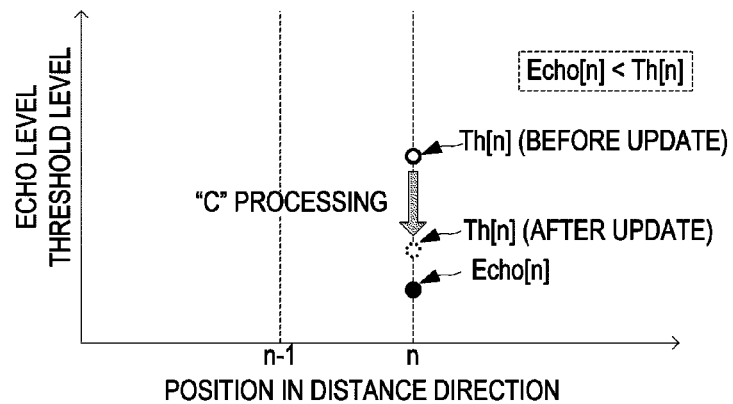

Next, the method of setting the threshold (the threshold setting algorithm) is described in detail. FIG. 2 is a flowchart of a threshold setting. FIGS. 3A to 3C are charts explaining contents of various kinds of threshold setting processing performed by the threshold setting flow. FIG. 3A is a chart explaining the processing at Step S105 in FIG. 2, FIG. 3B is a chart explaining the processing at Step S106 in FIG. 2, and FIG. 3C is a chart explaining the processing at Step S107 in FIG. 2. Note that, in the following description, although only an update of the threshold set for a certain position [n] (observing distance position) in sweep data is shown, this update of the threshold is performed for every distance position corresponding to the echo signals configuring the sweep data. Further, such setting is continuously performed in every scan. Here, one scan indicates a period of processing the echo signals for one revolution of the antenna. That is, the echo signals for the transmission signals transmitted while the antenna revolves once serve as the echo signals for one scan.

First, an initial value is set for the threshold set for each position. Therefore, the threshold set for a distance position closest to the antenna in the sweep data remains to be the initial value. However, the thresholds set for distance positions other than the distance position closest to the antenna adapt to situations by an algorithm with the following flow.

The threshold setting module 15 acquires a level Echo[n] of an echo signal at the observing distance position [n] from the echo signals in a single sweep inputted from the receiver 14 and reads a threshold Th[n]. The threshold setting module 15 compares the echo level Echo[n] and the threshold Th[n] (S101).

When the threshold setting module 15 determines that the echo level Echo[n] is above the threshold Th[n] (S102: Yes), the threshold setting module 15 reads a threshold Th[n−1] set for a distance position [n−1] adjacent on the antenna side to the observing distance position [n] and compares the threshold Th[n] set for the observing distance position [n] and the threshold Th[n−1] set for the adjacent position [n−1] (S103).

When the threshold setting module 15 determines that the threshold Th[n−1] set for the adjacent position [n−1] is above the threshold Th[n] set for the observing distance position [n] (S104: Yes), the threshold setting module 15 performs a correction where a correction value δ is added to the threshold Th[n] set for the observing distance position [n] (S105).

$$Th[n]=Th[n]+\delta \quad (A)$$

Note that, based on, for example, a relative difference between the echo level of the target object and a noise level, the correction value δ may be set to be below the relative difference by a predetermined level or more.

FIG. 3A is the illustration of this processing. That is, when the echo level Echo[n] at the observing distance position [n] is above the threshold Th[n] set for the same position and the threshold Th[n] set for the observing distance position [n] is below the threshold Th[n−1] set for the adjacent position [n−1], the threshold Th[n] set for the observing distance position [n] is increased by δ so as to come close to the threshold Th[n−1] set for the adjacent position [n−1]. Hereinafter, this processing is referred to as "A processing."

On the other hand, when the threshold setting module 15 determines that the threshold Th[n−1] set for the adjacent position [n−1] is below the threshold Th[n] set for the observing distance position [n] (S104: No), the threshold setting module 15 performs a correction where a correction value βδ is subtracted from the threshold Th[n] set for the observing distance position [n] (S106).

$$Th[n]=Th[n]-\beta\delta \quad (B)$$

Note that, β is set to a real number within a range of 0<β<1 and, by the setting of β, even if the threshold temporarily rises due to the A processing within a period of the target object echo, the threshold can gradually be reduced.

FIG. 3B is the illustration of this processing. That is, when the echo level Echo[n] at the observing distance position [n] is above the threshold Th[n] set for the same position and the threshold Th[n] set for the observing distance position [n] is above the threshold Th[n−1] set for the adjacent position [n−1], the threshold Th[n] set for the observing distance position [n] is reduced by βδ so as to come close to the threshold Th[n−1] set for the adjacent position [n−1]. Hereinafter, this processing is referred to as "B processing."

When the threshold setting module 15 determines that the echo level Echo[n] is below the threshold Th[n] (S102: No), the threshold setting module 15 performs a correction where the correction value δ is subtracted from the threshold Th[n] set for the observing distance position [n] (S107).

$$Th[n]=Th[n]-\delta \qquad (C)$$

FIG. 3C is the illustration of this processing. That is, when the echo level Echo[n] at the observing distance position [n] is below the threshold Th[n] set for the same position, the threshold Th[n] set for the observing distance position [n] is reduced by δ. Hereinafter, this processing is referred to as "C processing."

Figure 4A:
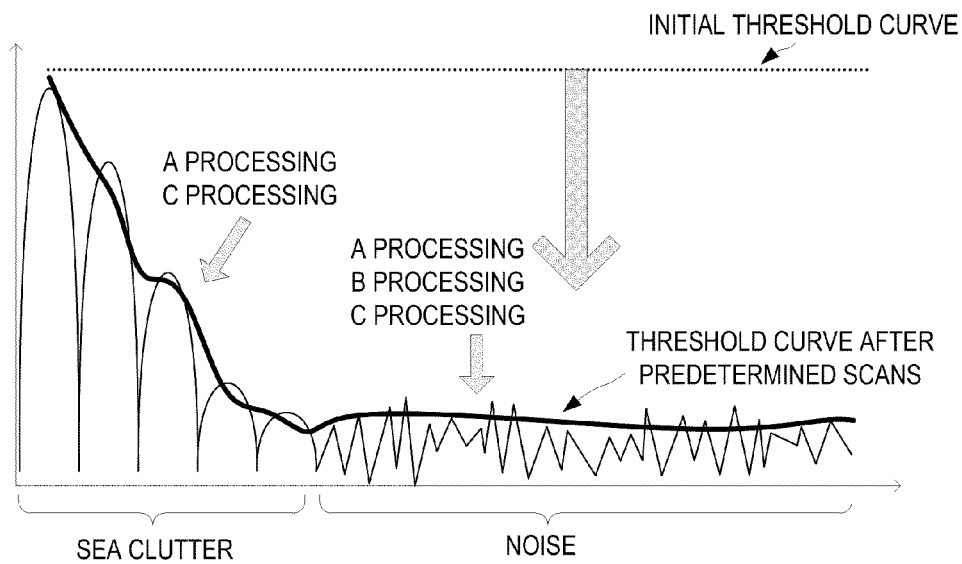
FIG. 4A is a chart showing how a threshold adapts at each distance position in a case where a target object does not exist and only a sea clutter and a noise exist.
Figure 4B:
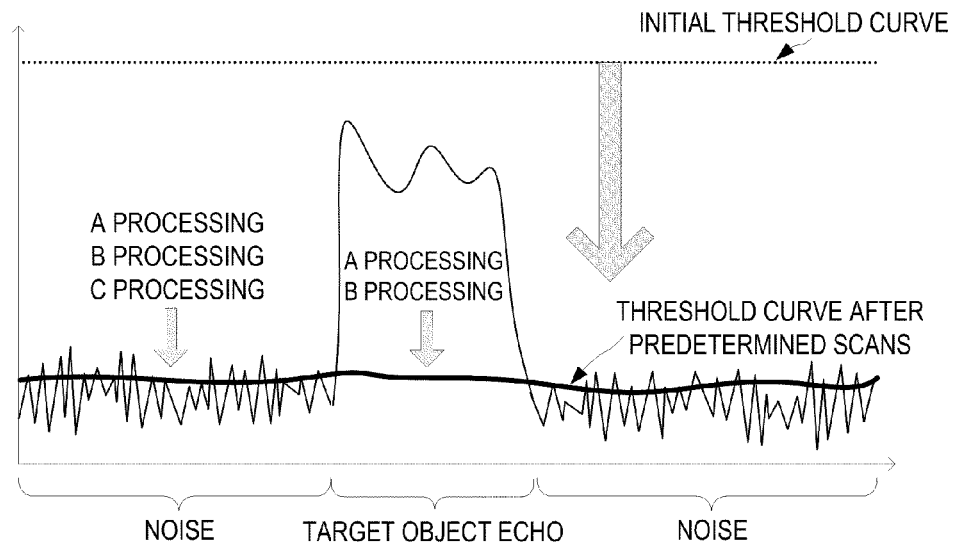
FIG. 4B is a chart showing how a threshold adapts in a case where the target object exists and the noise exists outside of a target object existing zone.

As above, by updating the threshold Th[n] set for the observing position [n] by using the echo level Echo[n] and the threshold Th[n] set for the observing position [n] and the threshold Th[n−1] set for the adjacent or closely situated position, the threshold can be set for each of the distance positions as shown in FIGS. 4A and 4B. FIG. 4A shows how the thresholds adapt at respective distance positions in a case where the target object does not exist and only a sea clutter and a noise exist. FIG. 4B shows how the thresholds adapt in a case where the target object exists and the noise exists outside of a target object existing zone. Note that, in FIGS. 4A to 4B, thin solid lines indicate echo signals, thick solid lines indicate adapted threshold curves, and thick broken lines indicate initial threshold curves.

(Sea Clutter Occurrence Zone)

First, after the update processing of the threshold starts, the C processing is continuously performed over successive scans until the threshold reaches near the level of the sea clutter, and the threshold level gradually falls.

Next, when the threshold falls to near a peak level of the sea clutter, the echo level of the sea clutter may become above the threshold. In this case, the A processing is performed. Here, the echo of the sea clutter has a distance dependency to which the echo level falls sequentially corresponding to the distance from the antenna. Thus, a difference between the levels in different scans is not large as long as the distance position is the same. Therefore, by performing the A processing as above and continuing the update processing of the threshold for over a plurality of scans, a threshold approximately the same as the average level of the sea clutter is set in the sea clutter occurrence zone. Thereby, as shown in FIG. 4A, a threshold corresponding to the average level of the sea clutter can automatically adaptively be set.

(Noise Occurrence Zone)

First, similar to the case of the sea clutter, when the update processing of the threshold starts, the C processing is continuously performed over successive scans until the threshold reaches near a level of the noise, and the threshold gradually falls.

Next, when the threshold falls to near the level of the noise, a difference between the echo level of the noise and the threshold frequently interchanges. Moreover, the relation hardly becomes the same continuously between the positions adjacent to each other in the distance direction. In this case, the A processing, the B processing and the C processing are performed randomly in substantially the entire noise occurrence zone.

(Target Object Echo Existing Zone)

As shown in FIG. 4B, the level of the target object echo is high compared to the echo level of the noise and maintained high continuously in the distance direction. Therefore, the threshold is adapted as follows.

In a boundary section on the antenna side of the target object close to the noise, the B processing is applied and the thresholds of the target object at the distance positions in the boundary section converge to a noise level immediately before the boundary section on the antenna side of the target object. Further, the thresholds set for the respective farther distance positions within the target object echo area converge to the noise level immediately before the boundary section on the antenna side of the target object due to the A processing and the B processing. Thereby, the threshold becomes substantially the same level as in the noise occurrence zone even within the target object echo area. Here, the threshold set for the adjacent distance position may be above the threshold set for the observing distance position due to the noise level on the antenna side of the target object echo. In this case, the A processing is performed and, thereby, the threshold increases. However, as described above, the A processing is not continuously performed because the noise level is not constant, that is the A processing and the B processing are suitably performed. Therefore, as a result, the threshold becomes substantially the same level as in the noise occurrence zone even within the target object echo area.

As above, by using the threshold setting processing of this embodiment, the threshold can automatically adaptively be set corresponding to the levels of the unused components, for example the levels of the sea clutter and the noise, without being affected by the existence of the target object. Further, by using the optimized threshold, the further accurate target object detection processing can be performed as described above.

Note that, the case where the correction value δ for being used in the update of the threshold is constant is described above; however, the correction value δ may be set, for example, comparatively larger from the initial setting of the threshold until a predetermined plurality times of scans are performed. Because the threshold approaches the level of the sea clutter or the noise faster by setting the correction value δ larger, an adapting speed of the setting can be increased.

Figure 5:
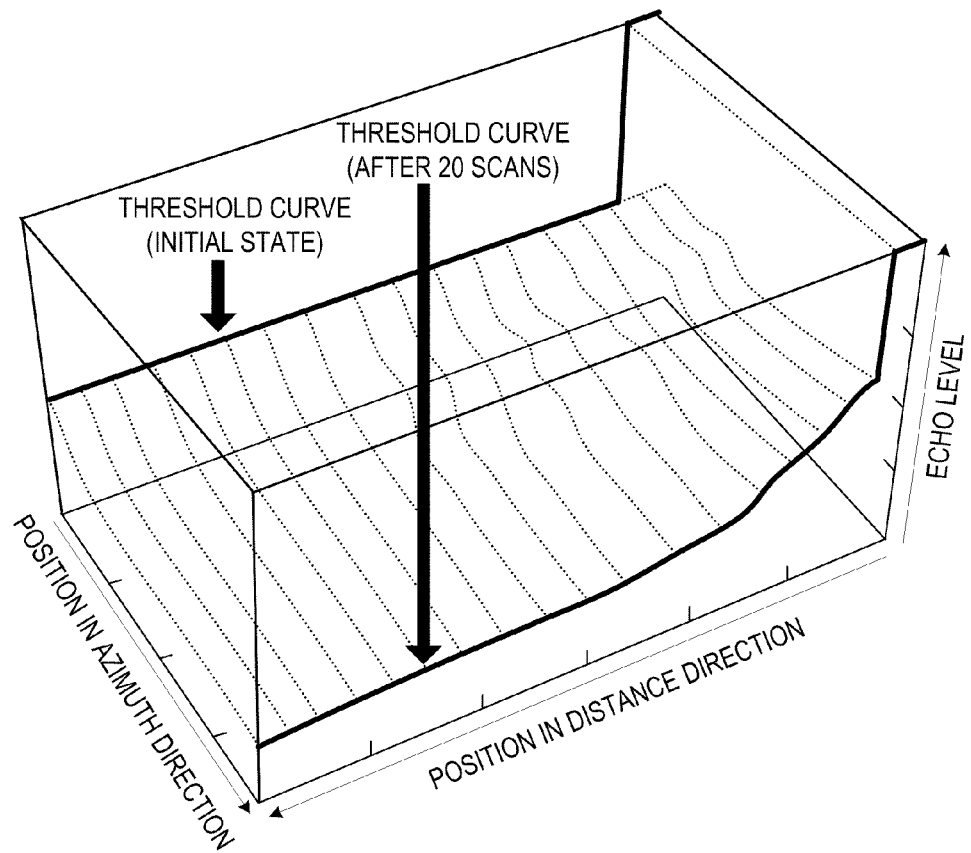
FIG. 5 is a three-dimensional chart showing a simulation of adaptation of a threshold curve in the case of FIG. 4A.

FIG. 5 is a three-dimensional chart showing a simulation of adaptation of a threshold curve in the case of FIG. 4A. The simulation is a result of including the processing of increasing the adapting speed. In FIG. 5, the vertical axis indicates a threshold, the first lateral axis indicates a transition of scans, and the second lateral axis indicates a position in the distance direction. As it can be understood from FIG. 5, by performing the threshold update processing of this embodiment, the threshold adapts according to situations every time the scan is repeated.

Figure 6:
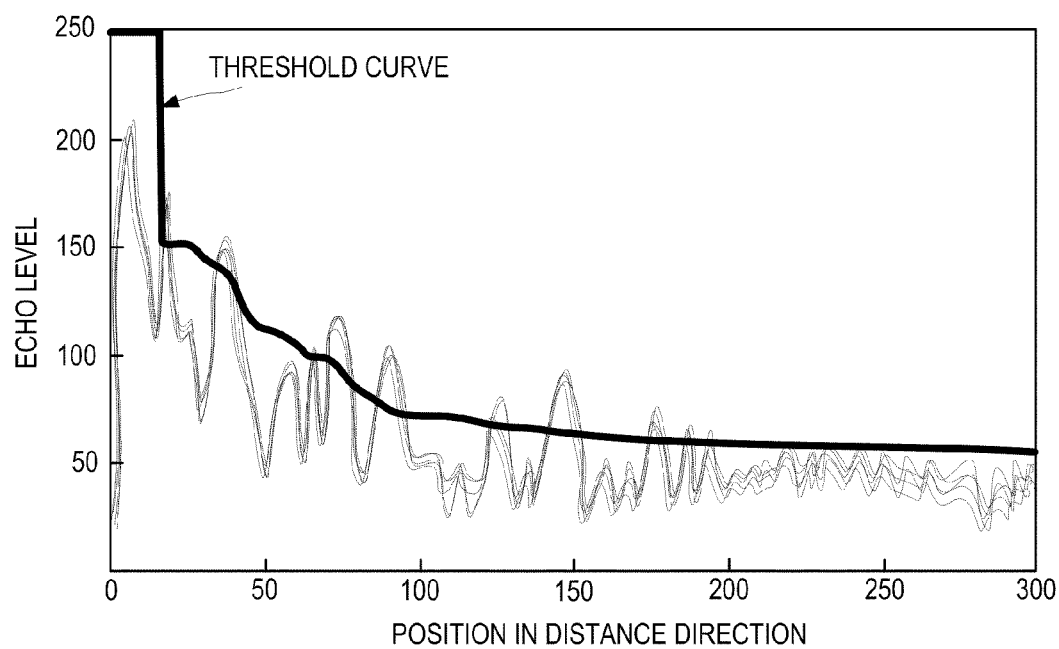
FIG. 6 is a chart showing a simulation of adaptation of the threshold curve in the case of FIG. 4A in a predetermined azimuth direction.

FIG. 6 is a chart showing a simulation of adaptation of the threshold curve after a predetermined scans (20 scans) in the case of FIG. 4A in a predetermined azimuth direction. In FIG. 6, the thick solid line indicates the threshold curve after the 20 scans and the thin solid line indicates levels of the echo signals in respective scans. Thus, as it can be understood from FIG. 6, by performing the threshold update processing of this embodiment, the threshold adapts according to situations where such as the sea clutter and the noise exist.

The example in which the threshold Th[n] and the echo level Echo[n] are compared as they are is described above; however, a value obtained by subtracting a predetermined offset value α from the threshold Th[n], and the echo level Echo[n] may be compared. Here, the predetermined offset value α may be set according to, for example, a variation level of the noise. Therefore, by causing a bias within frequencies of performing the A processing and the C processing based on the variation of noise also within the noise occurrence area through using the value calculated by subtracting the predetermined offset value α from a threshold, the control of the level to which the threshold converges can be performed.

Moreover, the example in which the correction (update) of the threshold is performed through adding or subtracting by the correction value δ is described above; however, the correction (update) of the threshold may be performed through multiplying and dividing by converting into a correction coefficient.

Second Embodiment

Next, a method of detecting a target object, the method including a method of setting the threshold, and a target object detection device equipped with a threshold setting device according to a second embodiment of the present invention is described in detail with reference to the accompanying drawings. In the method of setting the threshold, the setting of the threshold in an azimuth direction is described.

The method of setting the threshold according to the first embodiment is the method of adapting the thresholds set for respective distance positions along the same azimuth direction. Here, the antenna revolves as above and the target object detection device usually performs the target object detection for the entire periphery. Therefore, by performing the adaptation processing of the threshold for every azimuth direction (i.e., every sweep data), the adaptation processing of the threshold can be performed for the entire periphery. However, in this embodiment, the thresholds for the entire periphery are set by another method utilizing the adaptation processing of the threshold for a particular azimuth direction in the first embodiment.

Figure 7:
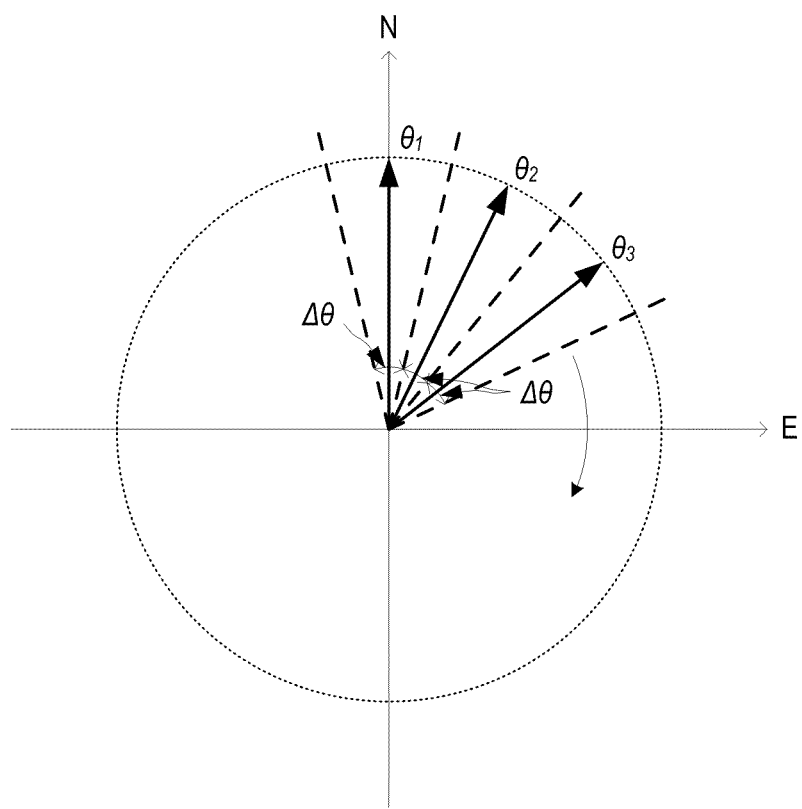
FIG. 7 is a view showing a concept in setting representative azimuth directions.

First, as shown in FIG. 7 a plurality of representative azimuth directions are set every predetermined angle along an azimuth angle direction following the rotation direction of the antenna 13. FIG. 7 is a view showing a concept in setting the representative azimuth directions.

The representative azimuth directions are obtained by dividing entire peripheral angle (360°) by every predetermined azimuth direction angle (Δθ) starting from a 0° direction (reference direction) toward north as an absolute azimuth direction. The threshold setting module 15 stores such representative azimuth directions $\theta_1, \theta_2, \ldots$ in advance.

When the threshold setting module 15 acquires sweep data in the representative azimuth direction, the threshold setting module 15 performs update of thresholds set for respective distance directions by using the method in the first embodiment. For example, when the threshold setting module 15 acquires sweep data in the representative azimuth direction $\theta_1$, the threshold setting module 15 performs update of thresholds $Th_1$ at respective distance positions, and when the threshold setting module 15 acquires sweep data in the representative azimuth direction $\theta_2$, the threshold setting module 15 performs update of thresholds $Th_2$ at respective distance positions.

Figure 8A:
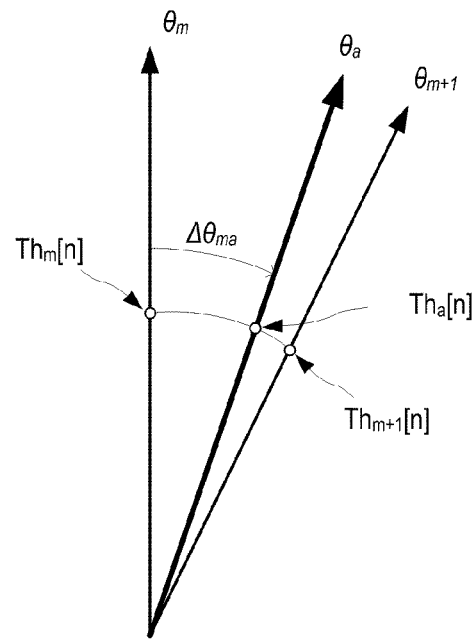
FIGS. 8A is a view explaining a method of interpolation calculation of thresholds in individual azimuth directions and 8B is a chart explaining a method of interpolation calculation of thresholds in individual azimuth directions.
Figure 8B:
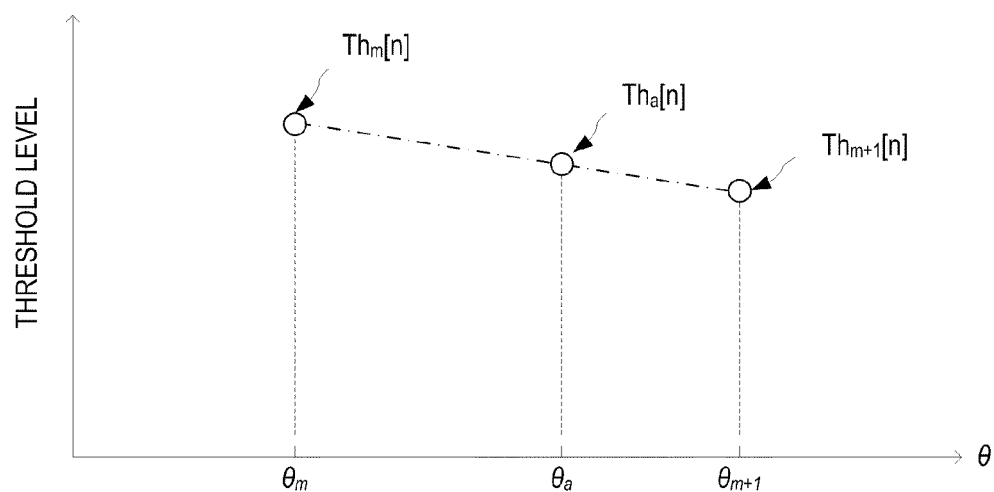

Next, the threshold setting module 15 performs an interpolation calculation for threshold in an individual azimuth direction between two representative azimuth directions by using the thresholds in two representative azimuth directions sandwiching the individual azimuth direction. FIGS. 8A and 8B are a view and a chart explaining a method of interpolation calculation of the thresholds in each of the individual azimuth directions, in which FIG. 8A shows an example of a spatial relation between the representative azimuth direction and the individual azimuth direction and FIG. 8B is a view showing a concept in setting the threshold of the individual azimuth direction.

When calculating a threshold $Th_a[n]$ set for a distance position [n] in an individual azimuth direction $\theta_a$, the threshold setting module 15 first acquires the individual azimuth direction $\theta_a$ from the absolute azimuth direction which is obtained along with the sweep data as above. Further, the threshold setting module 15 calculates an azimuth direction angle difference $\Delta\theta_{ma}$ between a representative azimuth direction $\theta_m$ closest to the individual azimuth direction $\theta_a$ in counterclockwise and the individual azimuth direction $\theta_a$.

The threshold setting module 15 acquires thresholds $Th_m[n]$ and $Th_{m+1}[n]$ set for the observing distance position [n] in two representative azimuth directions $\theta_m$ and $\theta_{m+1}$, respectively. The threshold setting module 15 calculates the threshold $Th_a[n]$ set for the distance position [n] in the individual azimuth direction $\theta_a$ by using the concept in the interpolation calculation as shown in FIG. 8B based on the following equation.

$$Th_a[n]=(\Delta\theta_{ma}/\Delta\theta)\times Th_m[n]+(1-\Delta\theta_{ma}/\Delta\theta)\times Th_{m+1}[n]$$

The threshold setting module 15 performs the interpolation calculation processing at respective distance positions in the individual azimuth direction $\theta_a$. Thereby, the update of the thresholds set for the respective distance positions in the entire peripheral direction can be performed and the processing in the first embodiment is not required to be performed for all the distance positions in each of the entire peripheral direction by using this method. Thus, the entire processing can be reduced in load and increased in speed. Here, the sufficiently accurate setting of the threshold can practically be performed by using the above processing. In the practical use, the sea clutter is, for example, a reflection of a wave and appears with a certain amount of width. Therefore, by suitably setting the predetermined azimuth angle $\Delta\theta$ between the representative azimuth directions, the threshold reflecting a state of the wave can sufficiently be set without performing the adaptation threshold setting processing to all the azimuth directions. Similarly, because a target object echo also has a predetermined width, the similar operation effect as in the case of the sea clutter can be obtained.

Figure 9A:
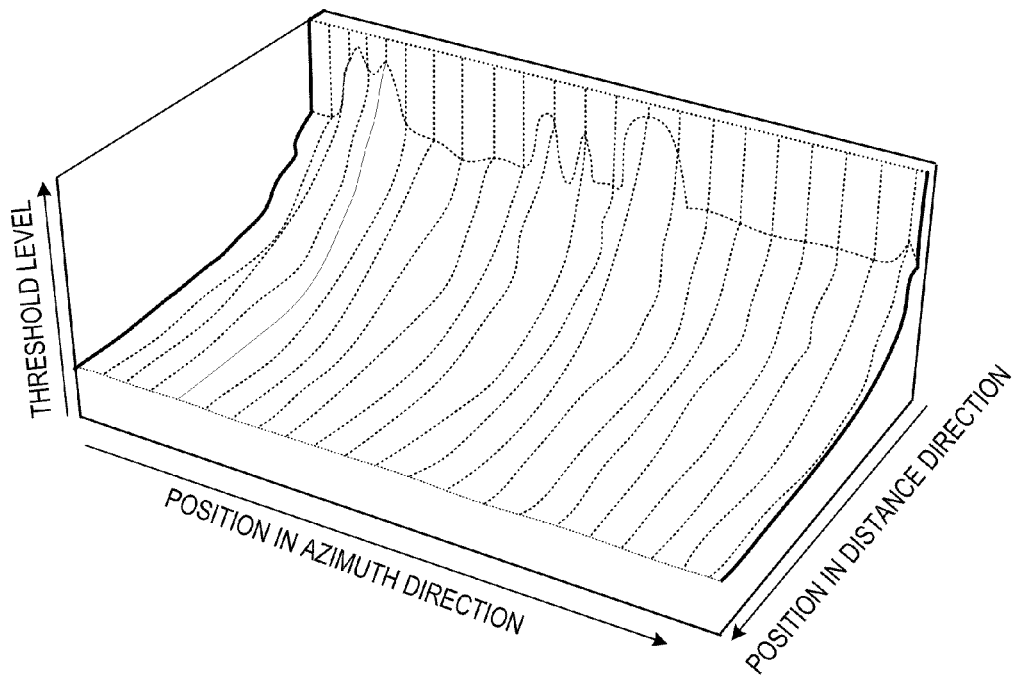
FIGS. 9A and 9B are charts showing a state where thresholds are adaptively set over the entire azimuth direction by a method according to a second embodiment.
Figure 9B:
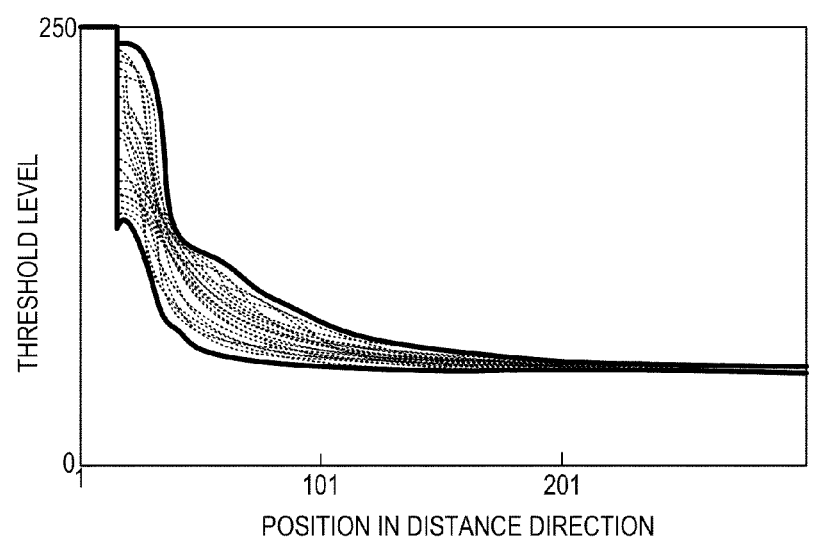

By utilizing the above processing, the threshold adapted to the entire azimuth direction is set as shown in FIGS. 9A and 9B. FIG. 9A is a three-dimensional chart showing a state where thresholds are set over the entire azimuth direction, in which the vertical axis indicates the threshold, the first lateral axis indicates the azimuth direction, and the second lateral axis indicates the position in the distance direction. FIG. 9B is a two-dimensional chart of FIG. 9A seen in the azimuth direction. As shown in FIGS. 9A and 9B, the threshold setting according to situations in respective azimuth directions can be performed by using the method of this embodiment. Note that, by utilizing the distribution of the above threshold setting, a direction from which a wave approaches and a height of the approaching wave can be estimated.

Figure 10A:
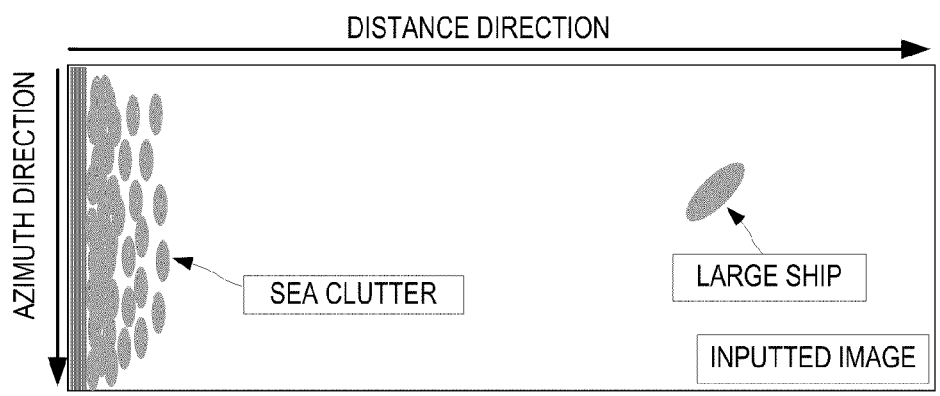
FIGS. 10A and 10B are views showing an effect (sea clutter and a large ship) after performing an adaptive threshold setting processing according to the embodiments of the present invention.
Figure 10B:
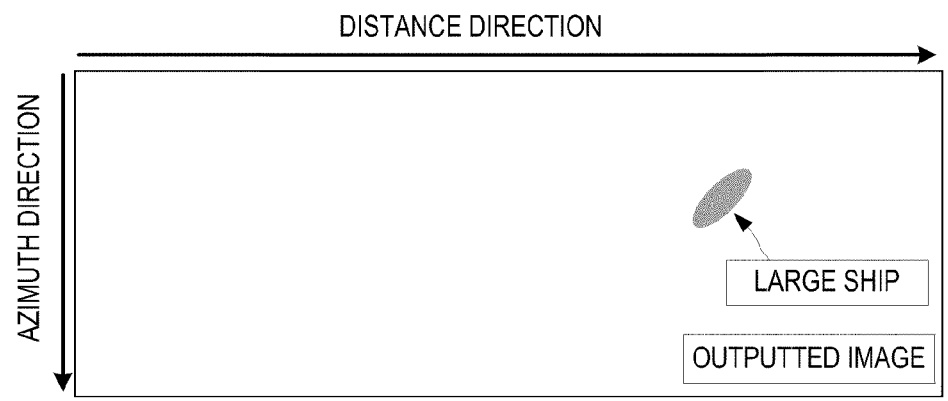
Figure 11A:
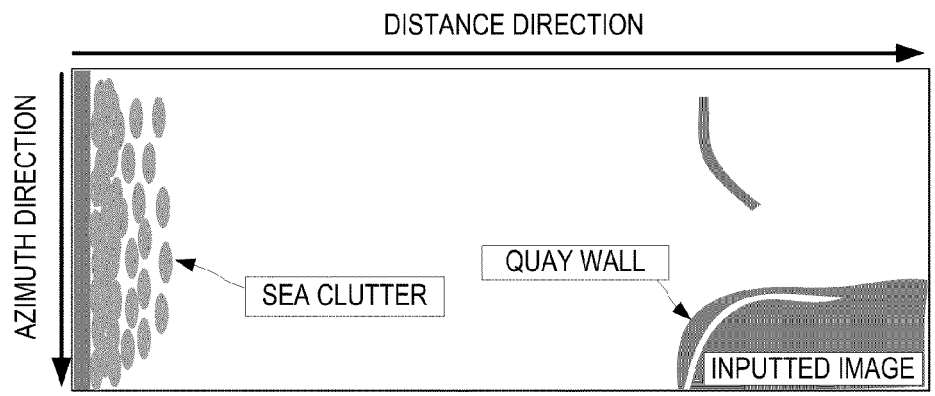
FIGS. 11A and 11B are views showing an effect (a land) after performing an adaptive threshold setting processing according to the embodiments of the present invention.
Figure 11B:
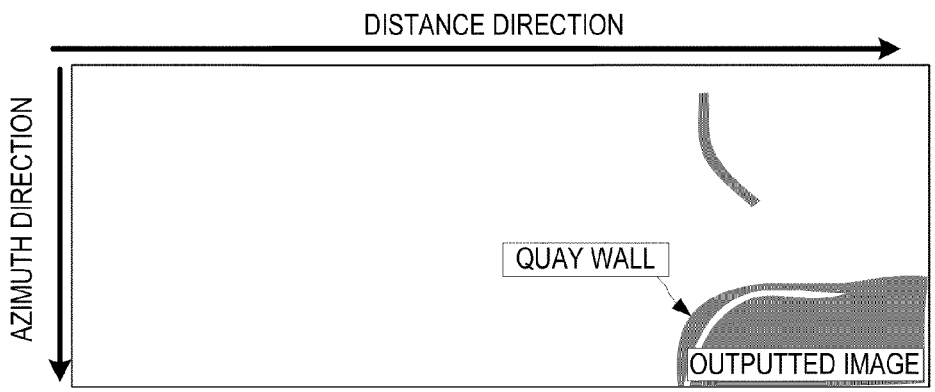
Figure 12A:
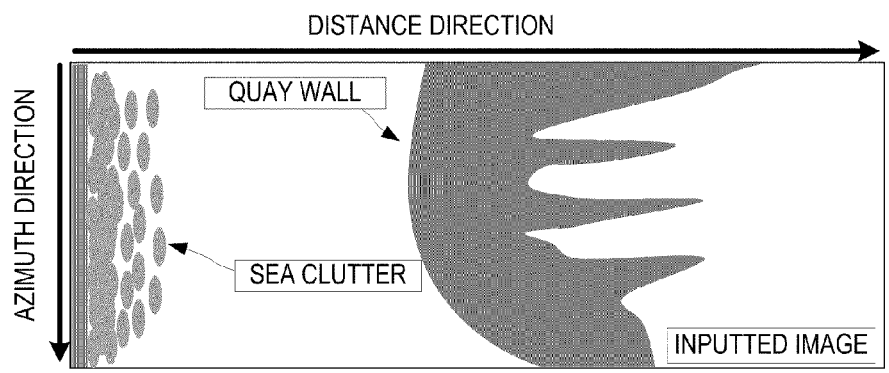
FIGS. 12A and 12B are views showing an effect (a land) after performing an adaptive threshold setting processing according to the embodiments of the present invention.
Figure 12B:
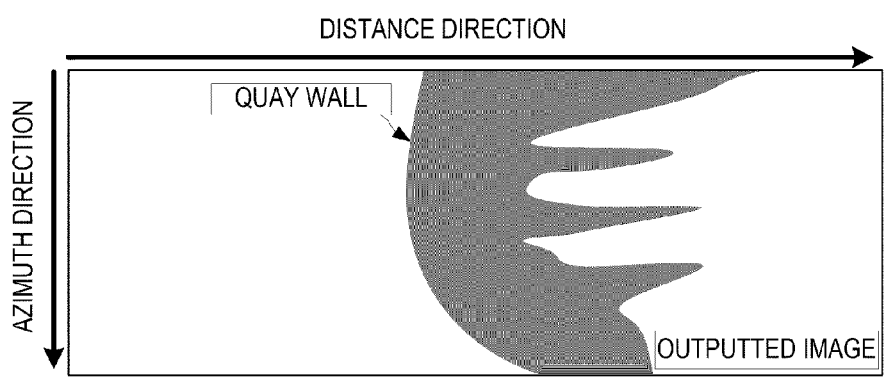

Further, with the above configurations and processing, effects as shown in FIGS. 10A and 10B, 11A and 11B, and 12A and 12B are obtained. FIGS. 10A and 10B, 11A and 11B, and 12A and 12B are views showing effects when performing the adaptive threshold setting processing according to the above embodiments. FIGS. 10A, 11A and 12A indicate detection images showing the echo signals as they are, respectively. FIGS. 10B, 11B and 12B indicate detection images where the echoes with the threshold or below are suppressed by performing the adaptive threshold setting processing according to the above embodiments. FIGS. 10A and 10B show a case where a large sea clutter and a large ship exist, and FIGS. 11A and 11B and 12A and 12B show a case where a small sea clutter and a land exist.

As shown in FIGS. 10A and 10B, 11A and 11B, and 12A and 12B, by performing the adaptive threshold setting processing according to the above embodiments, the threshold is automatically set according to the level of the sea clutter as well as the level of the noise without being affected by, even within a zone where a large ship and a land exist, echoes of the large ship and the land. Thereby, the detection images where only the sea clutter is suppressed while leaving the large ship and the land unaffected as shown in FIGS. 10B, 11B and 12B, as opposed to the detection images where the sea clutter remains along with the large ship and the land similar to the case using the conventional art as shown in FIGS. 10A, 11A and 12A, can surely be created.

Moreover, the example in which the processing of the present invention is applied to the radar apparatus equipped on the ship is described; however, the present invention may be applied to any devices as long as the device transmits a predetermined detection signal and acquire its echo signal.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or device that comprises, has, includes, contains a list of elements does not include only those elements but may include other elements not expressly listed or inherent to such process, method, article, or device. An element proceeded by "comprises . . . a," "has . . . a," "includes . . . a," "contains . . . a" does not, without more constraints, preclude the existence of additional identical elements in the process, method, article, or device that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the technique, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method of setting a threshold according to a level of an echo signal containing an unused component, the echo signal being generated by transmitting and receiving a radio wave with an antenna while the antenna revolves, the method comprising:
    acquiring levels of the echo signals at every predetermined distance interval; and
    updating, with a processor, a threshold set for an observing position based on the level of the echo signal at the observing position, the threshold set for the observing position, and a threshold set for a position closer to the antenna than the observing position by the predetermined distance on the same sweep, wherein the updating the threshold includes
        updating the threshold to be lower when the level of the echo signal at the observing position is below the threshold set for the observing position, and
        updating the threshold to be higher when the level of the echo signal at the observing position is above the threshold set for the observing position and the threshold set for the observing position is below the threshold set for the position closer to the antenna than the observing position by the predetermined distance on the same sweep.

2. The method of claim 1, wherein the updating the threshold includes updating the threshold set for the observing position based on a comparison of the level of the echo signal at the observing position with the threshold set for the observing position and a comparison of the threshold set for the observing position with the threshold set for the position closer to the antenna than the observing position by the predetermined distance on the same sweep.

3. The method of claim 1, wherein the updating the threshold includes updating the threshold to be lower when the level of the echo signal at the observing position is above the threshold set for the observing position and the threshold set for the observing position is above the threshold set for the position closer to the antenna than the observing position by the predetermined distance on the same sweep.

4. The method of claim 3, wherein the updating the threshold includes setting a lowering amount of the threshold when the level of the echo signal at the observing position is above the threshold set for the observing position and the threshold set for the observing position is above the threshold set for the position closer to the antenna than the observing position by the predetermined distance on the same sweep to be less than a lowering amount of the threshold that is used when the level of the echo signal at the observing position is below the threshold set for the observing position.

5. The method of claim 2, wherein, when comparing the level of the echo signal at the observing position with the threshold set for the observing position, the updating the threshold uses a value obtained by subtracting a predetermined offset value from the threshold set for the observing position, as the comparison result.

6. The method of claim 1, wherein the updating the threshold includes:
    updating the thresholds along a distance direction extending radially in a transmitting direction of the radio wave with respect to the position of the antenna as a reference position, and the update along the distance direction is performed at a plurality of particular azimuths set at a predetermined azimuth angle interval along a revolving direction of the antenna; and interpolating, based on the thresholds set for two of the particular azimuths interposing an individual azimuth therebetween, thresholds along the distance direction at the individual azimuth.

7. The method of claim 6, wherein the interpolating the threshold includes weighting with azimuth angle differences between the individual azimuth and the two particular azimuths, respectively, the thresholds set for the two particular azimuths at the same distance position.

8. A method of detecting a target object, comprising:
the method of setting the threshold of any one of claim 1; and
determining that the echo signal with a level above the set threshold is an echo signal of the target object.

9. A method of detecting a target object, comprising:
the method of setting the threshold of any one of claims 1; and
creating detection image data from which the echo signal with a level below the set threshold is suppressed.

10. A threshold setting device, comprising:
an antenna for transceiving a radio wave while revolving ;
an echo signal generating module for generating an echo signal from a reception signal received by the antenna; and
a threshold setting module for setting the threshold according to the level of the echo signal containing an unused component,
wherein the threshold setting module updates a threshold set for an observing position based on the level of the echo signal at the observing position, the threshold set for the observing position, and a threshold set for a position closer to the antenna than the observing position by the predetermined distance on the same sweep; and
wherein the threshold setting module
updates the threshold to be lower when the level of the echo signal at the observing position is below the threshold set for the observing position, and
updates the threshold to be higher when the level of the echo signal at the observing position is above the threshold set for the observing position and the threshold set for the observing position is below the threshold set for the position closer to the antenna than the observing position by the predetermined distance on the same sweep.

11. The threshold setting device of claim 10, wherein the threshold setting module updates the threshold set for the observing position based on a comparison of the level of the echo signal at the observing position with the threshold set for the observing position and a comparison of the threshold set for the observing position with the threshold set for the position closer to the antenna than the observing position by the predetermined distance on the same sweep.

12. The threshold setting device of claim 10, wherein the threshold setting module updates the threshold to be lower when the level of the echo signal at the observing position is above the threshold set for the observing position and the threshold set for the observing position is above the threshold set for the position closer to the antenna than the observing position by the predetermined distance on the same sweep.

13. The threshold setting module of claim 10, wherein the threshold setting module updates the thresholds along a distance direction extending radially in a transmitting direction of the radio wave with respect to the position of the antenna as a reference position, the update along the distance direction being performed at a plurality of particular azimuths set at a predetermined azimuth angle interval along a revolving direction of the antenna, and the threshold setting module interpolates, based on the thresholds set for two of the particular azimuths interposing an individual azimuth therebetween, thresholds along the distance direction at the individual azimuth.

14. A target object detection device, comprising:
the threshold setting device of any one of claims 10; and
an image data creating module for creating detection image data from which the echo signal with a level below the set threshold is suppressed.

15. A non-transitory computer-readable medium having embodied thereon a program for causing a computer to perform a method of setting a threshold according to a level of an echo signal containing an unused component, the echo signal being generated by transmitting and receiving a radio wave with an antenna while the antenna revolves, the method comprising:
acquiring levels of the echo signals at every predetermined distance interval; and
updatinq a threshold set for an observing position based on the level of the echo signal at the observing position, the threshold set for the observing position, and a threshold set for a position closer to the antenna than the observing position by the predetermined distance on the same sweep
wherein the step of updating the threshold includes
updating the threshold to be lower when the level of the echo signal at the observing position is below the threshold set for the observing position; and
updating the threshold to be higher when the level of the echo signal at the observing position is above the threshold set for the observing position and the threshold set for the observing position is below the threshold set for the position closer to the antenna than the observing position by the predetermined distance on the same sweep.

16. The program of claim 15, wherein the step of updating includes the threshold includes updating the threshold set for the observing position based on a comparison of the level of the echo signal at the observing position with the threshold set for the observing position and a comparison of the threshold set for the observing position with the threshold set for the position closer to the antenna than the observing position by the predetermined distance on the same sweep.

17. The program of claim 15, wherein the step of updating the threshold includes updating the threshold to be lower when the level of the echo signal at the observing position is above the threshold set for the observing position and the threshold set for the observing position is above the threshold set for the position closer to the antenna than the observing position by the predetermined distance on the same sweep.

* * * * *